(12) United States Patent
Peters et al.

(10) Patent No.: US 11,662,319 B2
(45) Date of Patent: May 30, 2023

(54) DEVICE AND METHOD FOR BORESCOPE INSPECTION OF JET ENGINES

(71) Applicant: Lufthansa Technik AG, Hamburg (DE)

(72) Inventors: Jan Oke Peters, Hamburg (DE); Jan Sassmannshausen, Hamburg (DE); Tim Frederik Zippel, Hasloh (DE); Tristan Lietz, Hamburg (DE); Eugen Roppelt, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 16/755,932

(22) PCT Filed: Oct. 16, 2018

(86) PCT No.: PCT/EP2018/078205
§ 371 (c)(1),
(2) Date: Apr. 14, 2020

(87) PCT Pub. No.: WO2019/076876
PCT Pub. Date: Apr. 25, 2019

(65) Prior Publication Data
US 2020/0319119 A1    Oct. 8, 2020

(30) Foreign Application Priority Data
Oct. 16, 2017   (DE) ..................... 10 2017 218 426.4

(51) Int. Cl.
*G01N 21/95*    (2006.01)
*G01N 21/954*   (2006.01)
(Continued)

(52) U.S. Cl.
CPC ........... *G01N 21/954* (2013.01); *F01D 25/28* (2013.01); *G01M 15/14* (2013.01)

(58) Field of Classification Search
CPC ...... G01M 15/14; G01N 21/954; F01D 25/28; F02M 21/0281; G02B 23/26
See application file for complete search history.

(56) References Cited

U.S. PATENT DOCUMENTS

| 3,690,775 A | 9/1972 | Cousins |
| 4,207,873 A | 6/1980 | Kruy |

(Continued)

FOREIGN PATENT DOCUMENTS

| CN | 101578143 A | 11/2009 |
| DE | 102005030647 B3 | 3/2007 |

(Continued)

*Primary Examiner* — Rebecca C Bryant
(74) *Attorney, Agent, or Firm* — Leydig, Voit & Mayer Ltd.

(57) ABSTRACT

A device enables borescope inspection of turbine blades of a high-pressure turbine stage of a jet engine. The device has a bend-free guide pipe for introducing a flexible borescope. The device also has: a guide for the guide pipe, the guide being configured to provide clear and reproducible positioning and orientation of the guide pipe; and a securing device configured to releasably secure the guide to an outer side of the jet engine. The securing device is configured to adjust the guide to a predetermined orientation with respect to the outer side of the jet engine. The guide pipe is rigid and shaped in such a manner that an end of the guide pipe that is introduced into the jet engine when the guide is orientated correctly is orientable so as to be directed between two predetermined guide blades.

20 Claims, 7 Drawing Sheets

(51) Int. Cl.
*F01D 25/28* (2006.01)
*G01M 15/14* (2006.01)

(56) References Cited

U.S. PATENT DOCUMENTS

| | | |
|---|---|---|
| 4,298,312 A | 11/1981 | MacKenzie |
| 4,784,463 A | 11/1988 | Miyazaki |
| 5,066,122 A | 11/1991 | Krauter |
| 5,644,394 A | 7/1997 | Owens |
| 7,458,768 B2 | 12/2008 | Dube et al. |
| 7,742,797 B2 | 6/2010 | Redel |
| 10,526,922 B2 | 1/2020 | Zippel |
| 2010/0200023 A1 | 8/2010 | Giljohann et al. |
| 2013/0192353 A1 | 8/2013 | Hatcher |
| 2013/0199040 A1 | 8/2013 | Dudeck et al. |
| 2015/0036130 A1 | 2/2015 | Konomura et al. |
| 2015/0168263 A1 | 6/2015 | Mueller et al. |
| 2015/0308337 A1 | 10/2015 | Marasco et al. |
| 2017/0219814 A1 | 8/2017 | Letter et al. |

FOREIGN PATENT DOCUMENTS

| | | |
|---|---|---|
| DE | 102016216895 A1 | 3/2018 |
| EP | 2623731 A1 | 8/2013 |
| GB | 2033973 A | 5/1980 |
| GB | 2036363 A | 6/1980 |
| GB | 2496903 A | 5/2013 |
| JP | H 11247616 A | 9/1999 |
| JP | 2000162510 A | 6/2000 |
| JP | 2004339944 A | 12/2004 |
| JP | 2007009909 A | 1/2007 |
| JP | 2015513026 A | 4/2015 |
| JP | 2015513630 A | 5/2015 |
| RU | 2006594 C1 | 1/1994 |
| RU | 2013758 C1 | 5/1994 |
| WO | WO 2013116006 A1 | 8/2013 |
| WO | WO 2013116078 A1 | 8/2013 |

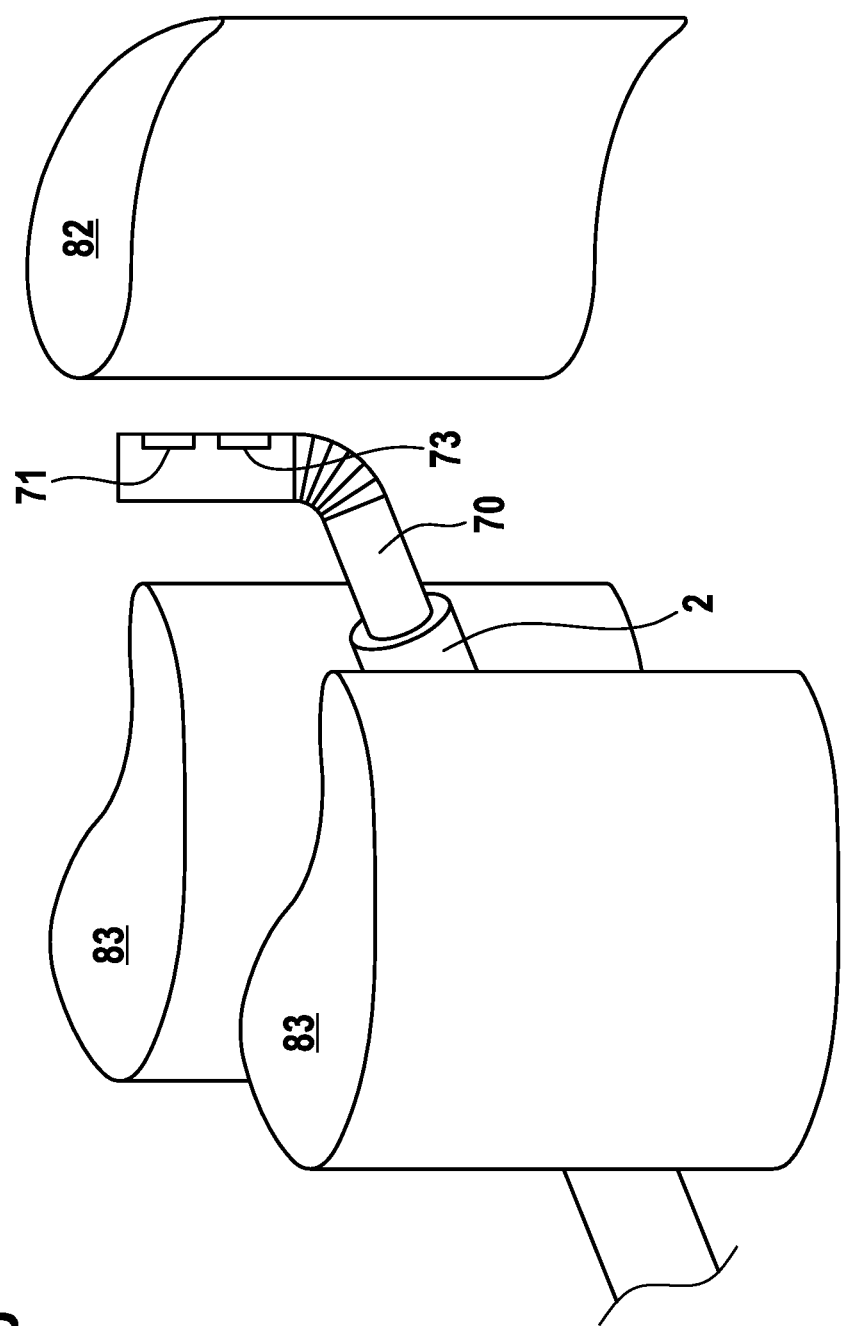

DEVICE AND METHOD FOR BORESCOPE INSPECTION OF JET ENGINES

CROSS-REFERENCE TO PRIOR APPLICATIONS

This application is a U.S. National Phase Application under 35 U.S.C. § 371 of International Application No. PCT/EP2018/078205, filed on Oct. 16, 2018, and claims benefit to German Patent Application No. DE 10 2017 218 426.4, filed on Oct. 16, 2017. The International Application was published in German on Apr. 25, 2019 as WO 2019/076876 under PCT Article 21(2).

FIELD

The invention relates to a device and a method for borescope inspection of j et engines.

BACKGROUND

The turbine blades of the high-pressure turbine belong as a result of high pressures and temperatures to the most heavily loaded components of a gas turbine of a jet engine. At the same time, even slight damage or deviations from the respective original shape of the high-pressure turbine blades has/have a not inconsiderable influence on the degree of efficiency of the engine, which ultimately has an effect on the fuel consumption. The turbine blades also have to be regularly examined for damage in order, where applicable, to repair or replace the turbine blades in good time before more significant engine damage occurs during operation.

Turbine blades of jet engines necessarily have for reasons of legal authorization a unique serial number. The serial numbers are in this instance arranged on the base of the turbine blades, by means of which the blades are secured to the blade carrier of the engine in order to prevent them from coming into contact directly with the hot gas flow and being made unrecognizable by it.

The disadvantage of the positioning of the serial number at the base of a turbine blade is that the serial numbers can no longer be seen after the turbine blades have been inserted. With a fully mounted gas turbine or a fully mounted jet engine, it is thus not possible to directly examine the serial number of an individual engine blade. Instead, in order to establish the serial number, the engine has to be disassembled.

It is of great interest to be able to clearly and reliably identify serial numbers of turbine blades, even with fully mounted jet engines, generally also when they are secured to the aircraft (on wing). Only via such a clear association is it possible to document progress of damage or other changes in a turbine blade between two inspections and/or to establish the origin of a turbine blade from a manufacturer or repair company without a complex and cost-intensive disassembly of the entire engine being required to do this.

Various methods for inspecting turbine blades using borescopes are known. A borescope can thus be introduced through a lateral opening into a completely assembled jet engine in order to thereby be able to visually inspect the turbine blades. In this instance, however, only a general examination of all turbine blades of a stage can be carried out without a clear association of the serial number with the individual turbine blades being possible. In the case of high-pressure turbine blades of the first stage, an added difficulty is that a borescope inspection can be carried out only with a flexible borescope which has been guided through a through-opening of the combustion chamber housing (for example, through a spark plug hole) into the combustion chamber and which cannot be positioned in a sufficiently precise and secure manner for reliable inspection inside the jet engine.

The patent application US 2015/0036130 A1 discloses a securing device for securing an endoscope for endoscopic inspection, in particular for inspecting turbine blades of an engine. The securing device is constructed in such a manner that the endoscope can be introduced into the engine via an external access, wherein the introduction direction is configured in such a manner that the endoscope can be guided directly via an internal access into the region of the turbine blades.

A retention device for an endoscope is disclosed in the U.S. Pat. No. 4,784,463 B. The retention device comprises a securing device and an auxiliary introduction member via which the endoscope can be inserted and orientated.

Both publications disclose only the possibility of generally checking turbine blades. A clear association of serial numbers with individual turbine blades is not possible with the two known publications.

There is known from the patent application DE 10 2005 030 647 B3 a device with an imaging endoscope, which comprises a guide pipe. On the guide pipe, there is provided at least one marking which can be identified by the imaging and by means of which the precise position of the imaging portion of the imaging endoscope can be established. With the known patent application, a clear association of serial numbers with individual turbine blades is also possible.

SUMMARY

An embodiment of the present invention provides a device that enables borescope inspection of turbine blades of a high-pressure turbine stage of a jet engine. The device has a bend-free guide pipe for introducing a flexible borescope. The device also has: a guide for the guide pipe, the guide being configured to provide clear and reproducible positioning and orientation of the guide pipe; and a securing device configured to releasably secure the guide to an outer side of the jet engine. The securing device is configured to adjust the guide to a predetermined orientation with respect to the outer side of the jet engine. The guide pipe is rigid and shaped in such a manner that an end of the guide pipe that is introduced into the jet engine when the guide is orientated correctly is orientable so as to be directed between two predetermined guide blades.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
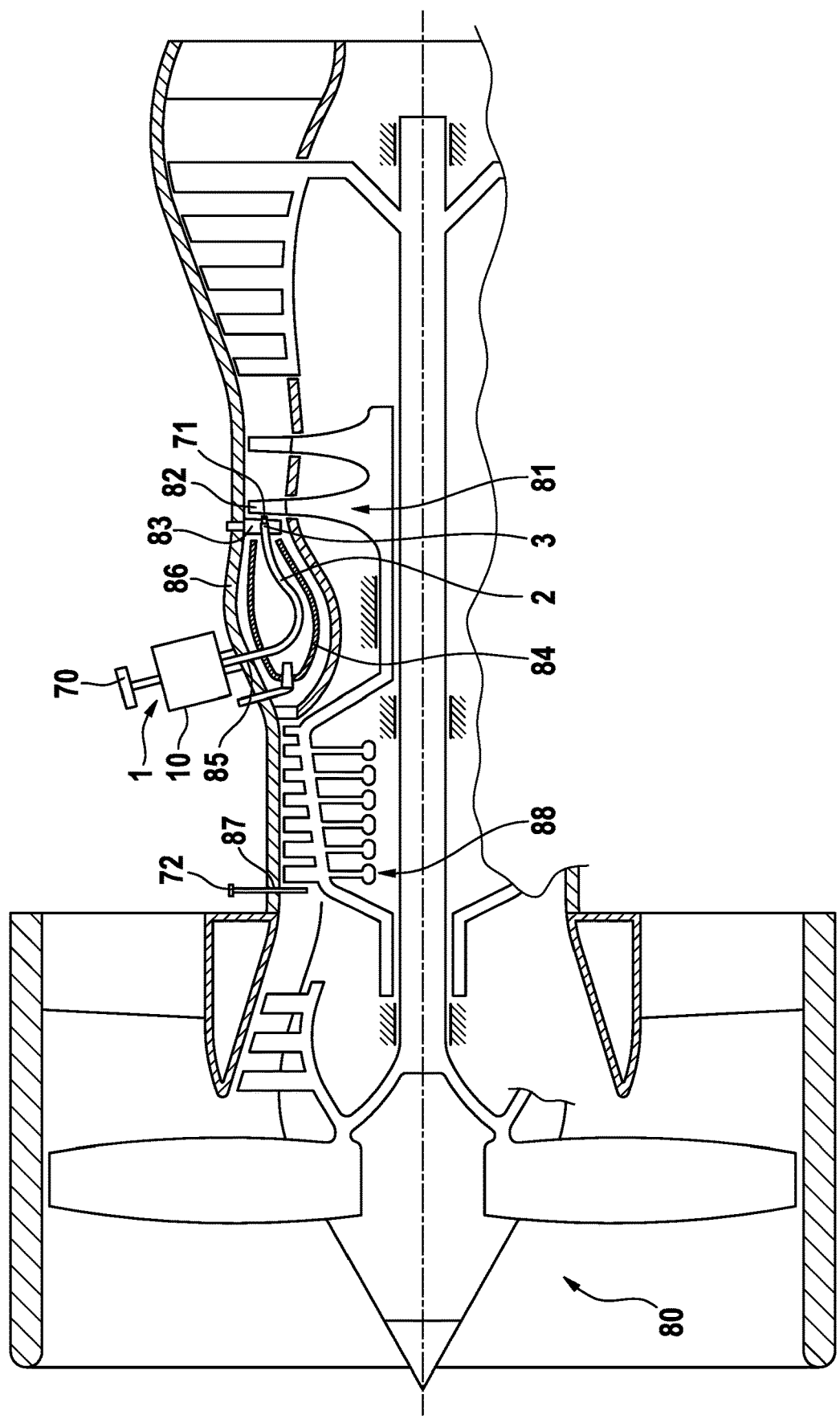
FIG. 1 is a schematic illustration of an embodiment of a method according to the invention with an embodiment of a device according to the invention.

Embodiments of the present invention provide a device and a method, by means of which the clear association of serial numbers with the turbine blades of the first stage of the high-pressure turbine of a mounted jet engine is possible.

An embodiment of the present invention relates to a device for borescope inspection of turbine blades of the first high-pressure turbine stage of a jet engine having a bend-free guide pipe for introducing a flexible borescope. The device includes a guide for the guide pipe for clear and reproducible positioning and orientation of the guide pipe and a securing device for releasably securing the guide to the outer side of the jet engine. The securing device has an orientation unit, by means of which the guide can be adjusted to a predetermined orientation with respect to the outer side of the jet engine. The guide pipe is rigid and shaped in such a manner that the end of the guide pipe, which is introduced into the jet engine when the guide is orientated correctly, can be orientated so as to be directed between two predetermined guide blades.

The invention further relates to a method for inspecting the turbine blades of the first high-pressure turbine stage of a jet engine, having the steps of:
a) introducing and securing a device according to the invention according to any one of the preceding claims to the predetermined lateral borescope opening of the jet engine in a predetermined orientation;
b) introducing a flexible borescope through the guide pipe;
c) rotating the high-pressure turbine stage and an additional component of the jet engine which is connected thereto in a rotationally secure manner under observation until a clear identification feature of the additional component is in a predetermined position;
d) identifying the turbine blades which can be seen through the first borescope as the first turbine blade.

The invention has recognized that it is indispensable for the association of serial numbers with turbine blades of the first high-pressure turbine stage of a mounted jet engine in the context of a borescope inspection to know the precise position of the borescope objective introduced into the engine or—in particular in the case of a (partially) automated inspection—to precisely comply with a predetermined position. Only in this manner is it possible—as provided for in the method according to the invention—to clearly identify a first turbine blade via an identification feature on another component of the jet engine which is connected to the first high-pressure turbine stage in a rotationally secure manner—and based on this to be able to associate serial numbers with the first and the additional turbine blades.

In order to inspect the turbine blades of the first high-pressure turbine stage, the borescope objective has to be guided through the combustion chamber between the guide blades, which are arranged between the combustion chamber and the first high-pressure turbine stage, or at least be orientated in such a manner that at least a portion of the image region of the borescope objective detects the turbine blades through and between the guide blades. A corresponding operation is only possible with a flexible borescope, such as, for example, fiberscope, flexoscope. Alternatively, the flexible borescope may also be constructed as a videoscope, in which, in place of an optical line along the borescope, a sensor (for example, a CCD or CMOS chip with a corresponding optical unit, for example, in the form of a lens adhesively bonded to the chip) which is arranged as a borescope objective at one end of the borescope which transmits the image recorded via a data line to a display.

In order to ensure that the borescope is located after introduction into the jet engine at a determinable or predeterminable position, the device according to the invention firstly has a bend-free guide pipe for introducing the flexible borescope. The term "bend-free" is intended to mean in this context that the guide pipe has no bends, but instead has only such curves that pushing through a flexible borescope is readily possible.

The ultimate position of the borescope objective in the device according to the invention is determined substantially by the end of the guide pipe inserted into the jet engine, wherein the position and orientation of the borescope objective is directly dependent on the position and orientation of the guide pipe. In this instance, the guide pipe is preferably configured in such a manner that the borescope, which is introduced for final inspection of the turbine blades, protrudes from the guide pipe only by a maximum of such a length that no unpredictable deviations in position and orientations of the borescope objective as a result of the flexibility of the borescope may be anticipated. The flexible borescope should be guided over such a length through the guide pipe that the portion of the flexible borescope protruding from the guide pipe is not subjected to any unintentional bending or the like. It is also possible for the borescope not to protrude from the guide pipe, thus for the borescope objective to be arranged directly at the end of the guide pipe.

In order to be able to clearly determine or reproducibly adjust the position and orientation of the guide pipe with respect to the turbine blades or guide blades of the high-pressure turbine, there is provision according to the invention for the guide pipe to be configured in a rigid manner to guide through a guide in a securing device. By determining the position of the guide pipe with respect to the guide, the relative position and orientation of the end of the guide pipe which is intended to be introduced into the jet engine can be determined. As a result of an adjustment of this relative position, the end of the guide pipe in question can also be positioned and orientated with respect to the guide in a clear and reproducible manner.

So that the guide permits a clear and reproducible positioning and orientation of the guide pipe, it is preferable for the guide pipe and/or guide to have means, via which the relative movement with respect to each other can be determined in defined positions of the guide pipe in the guide and/or the number of degrees of freedom of the guide pipe in the guide is limited. In both cases, the guiding is carried out without play to the greatest possible extent.

There may be provided, for example, locking elements and/or securing screws by means of which the guide pipe can be adjusted selectively in positions predetermined by the locking elements and/or securing screws with respect to the guide. The locking elements and/or the securing screws may in this instance be arranged in the guide or the guide pipe, wherein the respective other component then has, for example, corresponding indentations or recesses for engagement of the locking elements and/or securing screws.

In order to limit the number of degrees of freedom of the guide pipe in the guide, there may be provided, for example, groove, rail or linear guides, which limit the degrees of freedom of the relative movement of the guide pipe with respect to the guide to the direction predetermined by the groove and/or rail. The movability of the guide pipe in the guide can thus be limited, for example, to an individual linear movement without degrees of freedom of rotation existing.

It is preferable for the guide to be constructed to limit the movability of the guide pipe with respect to the guide to one degree of freedom. The degree of freedom may in this instance represent a rotational movement, a linear movement, and/or any, also partial, combination thereof. It is preferable for the single degree of freedom to which the movement is limited to be a rectilinear translation degree of freedom. It is preferable for the single degree of freedom to be configured in such a manner that—in the assembled state of the device—by moving along the single degree of freedom the free end of the guide pipe is moved in a direction radially with respect to the axis of the rotor of the jet engine, preferably in a linear manner. As a result of a corresponding possibility for movement, it is possible, for example, for a turbine blade which is intended to be inspected—if it is not completely detected by the borescope—to be travelled along the length thereof in order to be able to inspect the turbine blade over the entire length thereof.

In order to ensure that the borescope, after introduction, has the orientation and position that is actually desired for the borescope inspection with respect to the turbine blades, it is not only necessary to know or adjust the relative position of the borescope objective with respect to the guide, which can be established by means of the position and orientation of the guide pipe, but also the position and orientation of the guide with respect to the jet engine itself. The position of the guide is in this instance substantially predetermined by the through-opening for the guide pipe in the jet engine.

The invention has recognized that a direct securing of the guide at the outer side of the jet engine in the region of the through-opening without further adjustment possibilities, the clear determination or adjustment of the position and orientation of the guide pipe often cannot be safely ensured. For example, as a result of intended tolerances or deformations of individual components of the jet engine, in particular in the region of the through-opening, there may be produced orientation deviations which are reflected in deviations of the position and orientation of the end of the guide pipe which is introduced into the jet engine. For example, a flange which surrounds the through-opening at the outer side of the jet engine may thus have an orientation which deviates from a plane which extends parallel with the axis of the jet engine, whereby the free end of a guide pipe with a guide which is configured with respect to the parallel plane and which is directly connected to the flange, does not correspond to the expected or desired position and orientation.

In order to compensate for this, the device according to the invention comprises a securing device with an orientation unit, by means of which the orientation of the guide can be adjusted. As a result of the orientation unit of the securing device, orientation errors can be avoided since the orientation of the guide is no longer predetermined by the region of the outer side of the jet engine at which the guide is secured, but instead can be adapted by the orientation unit.

The securing device may have as a securing means a threaded portion for engagement in a thread of the through-opening for the guide pipe and/or screws for releasable securing to the outer side of the jet engine. In particular, the thread portion may be part of a hollow screw having a conical head. The guide pipe may be guided through the hollow screw which may in turn engage in an inner thread of the through-opening. As a result of the conical head, it is with suitable formation of the corresponding counter-piece of the securing device possible to secure the counter-piece in the through-opening in a suitable position for the desired orientation of the guide and to secure it in this position.

The securing device has, between the securing means or a portion of the securing device that is secured in a fixed manner with respect to the jet engine (for example, the securing means) and the portion of the securing device that surrounds the guide, a movable and/or deformable portion, which enables the orientation of the guide. The orientation device may act directly on this portion, for example, by the position of the two securing portions of the device being able to be changed and/or secured with respect to each other via the orientation device.

The orientation unit preferably comprises one or more stop faces, which are configured to abut defined components of the jet engine and are connected to the portion of the securing device which surrounds the guide. Preferably in this instance, at least a portion of the stop faces can be adjusted, for example, displaced using adjustment screws or threaded spindle. It is also possible for the free end of an adjustment screw to directly form an adjustable stop face. As a result of the stop faces, the orientation of the guide with respect to the outer side of the jet engine is fixed, wherein the adjustability of the stop faces makes the orientation of the guide adjustable.

In the device according to the invention for borescope inspection of turbine blades of one of the first turbine stages of a jet engine, the position and the orientation of the outlet opening of the guide pipe can be reliably adjusted to a specification as a result of the orientability of the guide as provided for according to the invention and the reproducible positioning of the guide pipe with respect to the guide, and consequently then also the position of the borescope objective of a flexible borescope which is guided through the guide pipe. The correct orientation of the guide required for this can be achieved by orientating the guide with respect to components of the engine, the position of which can be used as a reliable reference, for example, by stop faces abutting these components. Alternatively or additionally, it is possible for the correct orientation of the guide to be found by means of measurement, for example, by means of laser, or by means of auxiliary orientation members arranged on the guide.

It is preferable for the device to comprise a guide mechanism, by means of which the guide pipe can be moved along the guide. In this instance, the guide mechanism is preferably configured in such a manner that it moves the end of the guide pipe which is introduced into the jet engine in a direction radial relative to the axis of the rotor of the jet engine, preferably in a linear manner. The movement may, for example, be achieved by limiting the movability of the guide pipe to a corresponding individual degree of freedom. In this instance, it is self-evident that the desired movability of the guide pipe will regularly occur only when the guide is orientated in accordance with the respective provisions. A corresponding movement possibility of the guide pipe is advantageous when the image range of a borescope which is guided through the guide pipe detects a turbine blade not completely, but only partially. As a result of the described movement, it is possible to "travel" along the length of, and thus completely inspect, the turbine blade which is intended to be inspected.

The guide mechanism may have a crank drive for introducing the movement along the guide. In this instance, the crank may be longitudinally adjustable in order to adapt the travel range of the device to the length of the turbine blades which are intended to be inspected.

Alternatively, it is possible for the guide mechanism to comprise a helical gear. By rotating the threaded spindle of the helical gear, the guide pipe can be moved relative to the guide. The use of a linear actuator motor is also possible.

The guide mechanism may be driven manually, for example, by means of a manual crank. However, it is preferable for the guide mechanism to comprise a controllable drive, preferably a step motor, for moving the guide pipe along the guide. If a crank drive is provided, the drive can act on the crank drive; in the case of a helical gear, it acts on the threaded spindle. As a result of a corresponding drive, automated image detection of a turbine blade is possible over the entire length thereof. To this end, the borescope objective is guided via the guide mechanism acting on the guide pipe guiding the borescope longitudinally past the turbine blade, wherein image information which has been detected in this instance is combined to form a continuous image of the entire turbine blade in a comparable manner to a panoramic exposure which is produced by means of stitching of a plurality of images.

So that the device can be used in a variable manner for different engine models, the guide pipe is preferably configured to be replaceable. As a result of the replacement of the guide pipe, the device can be adapted to different engine geometries.

For simpler handling, the device can preferably be disassembled into sub-assemblies. The device thereby does not have to be secured in a single step and as a whole to the jet engine, which, as a result of the required introduction of the guide pipe into the opening of the jet engine, may be difficult, but it is instead possible to assemble the components which are combined to form sub-assemblies of the device one after the other. For example, the guide pipe may form a sub-assembly, whilst the guide is associated with another subassembly. As a result of the ability of the device to be disassembled, the capacity of the device for storage and transport can also be improved.

The guide pipe may be configured in such a manner that the end thereof which is introduced into the jet engine in the mounted state of the device is arranged between two guide blades which are located in front of the turbine blades of the first turbine stage. However, it is preferable for the guide pipe and the relevant end to be spaced apart from the front edges of the guide blades. The guide pipe should not be introduced between the guide blades. This affords the advantage that the risk of damage to the guide blades as a result of incorrect use of the device can be reduced. In this instance, it is not excluded that the flexible borescope which is introduced through the rigid guide pipe protrudes into the region between two guide blades.

It is preferable when the guide pipe is configured in such a manner that the borescope for detecting the turbine blades protrudes by a maximum of 150 mm, preferably by a maximum of 50 mm from the guide pipe. The guide pipe must in this instance thus accordingly come close to the position provided for the borescope objective. By the borescope protruding only by a specific degree from the guide pipe, gravity-related positional deviations as a result of the flexibility of the borescope can be minimized. If the borescope used in order to orientate the borescope objective is angled after being guided through the guide pipe (for example, since the borescope objective and/or a CCD or CMOS chip which is provided as a borescope objective are arranged laterally on the borescope), the maximum length given relates to the distance between the end of the guide pipe and the location of the angling of the borescope. In order to ensure that the borescope objective protrudes only by a predetermined maximum length from the guide pipe, the device may have a stop with which the borescope comes into contact when it reaches the desired position during insertion into the guide pipe. The borescope may also be provided with suitable markings via which, when used with a device according to the invention, the length by which the borescope protrudes from the free end of the guide pipe can be read from outside the jet engine. It is also possible for the device to comprises a borescope which is formed integrally with the guide pipe or which is securely connected thereto. In this instance, the borescope is not pushed through the guide pipe after the guide pipe has been introduced into the jet engine, but instead is introduced as an integral component of the guide pipe directly therewith into the jet engine.

Since, with the device according to the invention, the position and orientation of a borescope with respect to the turbine blades of the first stage of a high-pressure turbine can be clearly established or adjusted, the turbine blades of the first stage of the high-pressure turbine of a jet engine can also be clearly identified in the state in which the jet engine is assembled and/or mounted on the aircraft. This is because, if the borescope is orientated as a result of the device according to the invention in a known position and orientation with respect to the turbine blades of the first high-pressure stage, via the angular position of the axis on which the turbine stage is secured in a rotationally secure manner, a clear association of the individual turbine blades can be carried out. This is accordingly the subject-matter of the method according to the invention.

Accordingly, after the introduction and securing of a device according to the invention, a flexible borescope is pushed through the guide pipe in such a manner that the turbine blades of the first high-pressure turbine stage can in principle be seen through the borescope. Subsequently, the high-pressure turbine stage is rotated to a known angular position by another component which is connected thereto in a rotationally secure manner being monitored until a clear identification feature of the additional component is in a predetermined position. The other component may, for example, be a compressor stage which rests on the same shaft as the first high-pressure turbine stage. Since the compressor stages of a jet engine are not so heavily loaded as the turbine stages (with particular regard to the temperature), the compressor stages often have identification features which can also be seen in the completely assembled state of an aircraft engine, for example, using a second borescope which is introduced through a second lateral opening of the jet engine. If the high-pressure turbine stage is moved to an angular position which can be clearly determined by means of another component which is connected thereto in a rotationally secure manner, it can be established via the position and orientation of the borescope which turbine blade of the high-pressure turbine stage is located in the viewing range of the borescope which is guided through the guide pipe of the device, whereby, for example, the association of a serial number is also possible using a set card. The additional turbine blades can be identified by the high-pressure turbine stage being rotated whilst being monitored by the flexible borescope and the turbine blades which are guided past by the borescope being counted. The serial numbers of the additional turbine blades are then obtained directly from the set card of the high-pressure turbine stage.

"Set cards" are conventional in aircraft engines. On the set card, all the blades of a stage of the jet engine are listed with reference to their serial number. Furthermore, the sequence of the individual blades in the peripheral direction can be established from the set card. Using the set card for each blade of a stage of the jet engine, it can be established which two blades are arranged adjacent thereto in each case.

In this case, set cards according to the prior art indicate in principle only the relative position of the individual turbines or compressor blades of a stage of a jet engine so that the described establishment of the first turbine stage is often not possible or only possible with difficulty with a set card according to the prior art. However, in DE 10 2016 216 895 A1—to which reference is made in its entirety—a method is described as to how the set card known per se can be expanded with information which enables the desired identification of the first turbine blade. Without thereby limiting the disclosure of the cited DE 10 2016 216 895 A1 or limiting the reference, in this document it is suggested in summary during the assembly of a jet engine to mark on the set card the turbine blade which, at a predefined angular position of the high-pressure turbine is located in the mounted state in a previously defined borescope field of vision.

As a result of the precise positioning and orientation determination or adjustment of a flexible borescope which are enabled according to the invention for inspecting the turbine blades of the first high-pressure turbine stage, using a correspondingly marked set card a first turbine blade can be clearly determined. Either the flexible borescope with the device according to the invention is positioned and orientated in such a manner that the borescope field of vision corresponds to the one which formed the basis of the marking on the set card or, using the position and orientation of the borescope which can be established, the turbine blade located in the field of vision is established by means of geometric calculations based on the turbine blade marked on the set card.

If the identification feature on the additional component is targeted by a second borescope, it is preferable for the second borescope to be rigid and/or secured to the jet engine. As a result of the rigid construction and/or the securing to the jet engine, it can be ensured that the high-pressure turbine blade is rotated in a sufficiently precise manner to the angular position required to identify the first turbine blade.

The identification feature of the additional component may preferably be a blade lock of a compressor stage. If the compressor stage which is provided as an additional component has a plurality of blade locks, the identification feature is preferably the blade lock the spacing of which in the peripheral direction counter to a predetermined rotation direction between the blade lock and the adjacent blade lock is smallest. The blade lock in question can be readily made out by rotating the compressor stage with observation. This is accordingly described in greater detail in DE 10 2016 216 895 A1.

The invention is now described by way of example with reference to an advantageous embodiment and the appended drawings.

FIG. 1 is a schematic illustration of the implementation of a method according to the invention for clear identification of a first turbine blade 82' of the first high-pressure turbine stage 81 of a jet engine 80.

FIG. 1 shows the jet engine 80 in the almost completely assembled state. Only the turbine cover is partially removed in order to have access to the core engine.

In a first step, a device 1 according to the invention was introduced and secured. The precise configuration and the ultimate introduction of the device 1 is explained below with reference to FIGS. 2 and 3. For the explanation of the method, it is initially sufficient for the guide pipe 2 of the device 1 to be introduced in such a manner through a lateral borescope opening 85 through the combustion chamber 84 and between the guide blades 83 of the high-pressure turbine and secured via the guide 10 at the outer side 86 of the jet engine 80 or the core engine. As will be explained in greater detail below, as a result of the device 1 according to the invention, it is ensured that the end 3 of the guide pipe 2 introduced into the jet engine 80 is located in a predetermined or at least clearly determinable position and orientation with respect to the turbine blade 82. In particular, the guide pipe 2 can be orientated in such a manner that the end 3 is directed through and between the guide blades 83. Consequently, the objective 71 of the flexible borescope 70 pushed through the guide pipe 2 is also in a clearly defined position and orientation directly in front of the turbine blades 82 located in the field of vision of the borescope 70.

As a result of an additional borescope opening 87 on the jet engine 80, a second rigid borescope 72 is introduced and secured. Via this borescope 72, the blades of the first high-pressure compressor stage 88 can be observed. The blade lock of the first high-pressure compressor stage 88 can also be seen through this second borescope 72.

According to the invention, there is provision for the high-pressure compressor stage 88 to be rotated until it is determined via the second borescope 72 that the blade lock of this compressor stage 88 is in a predetermined position. Since the first high-pressure turbine stage 81 is connected to the high-pressure compressor stage 88 in a rotationally secure manner, using the set card of the high-pressure turbine stage 81 and the angular position which has been verified by means of the second borescope 72, as a result of the known position and orientation of the guide pipe 2 or the borescope 70 which is introduced therein, the turbine blade which can be seen through the borescope 70 can be identified. To this end, it is only necessary for the set card to have a suitable marking of at least one turbine blade according to DE 10 2016 216 895 A1 in which the method for identifying turbine blades is explained with reference to the high-pressure turbine stages following the first high-pressure turbine stage.

The clear identification of a first turbine blade 82 of the first high-pressure turbine stage 81 of the jet engine 80 is, however, only possible since the device 1 according to the invention ensures a clear position and orientation of the objective 71 of the borescope 70. An embodiment of a suitable device 1 according to the invention is now explained with reference to FIGS. 2 and 3.

Figure 2:
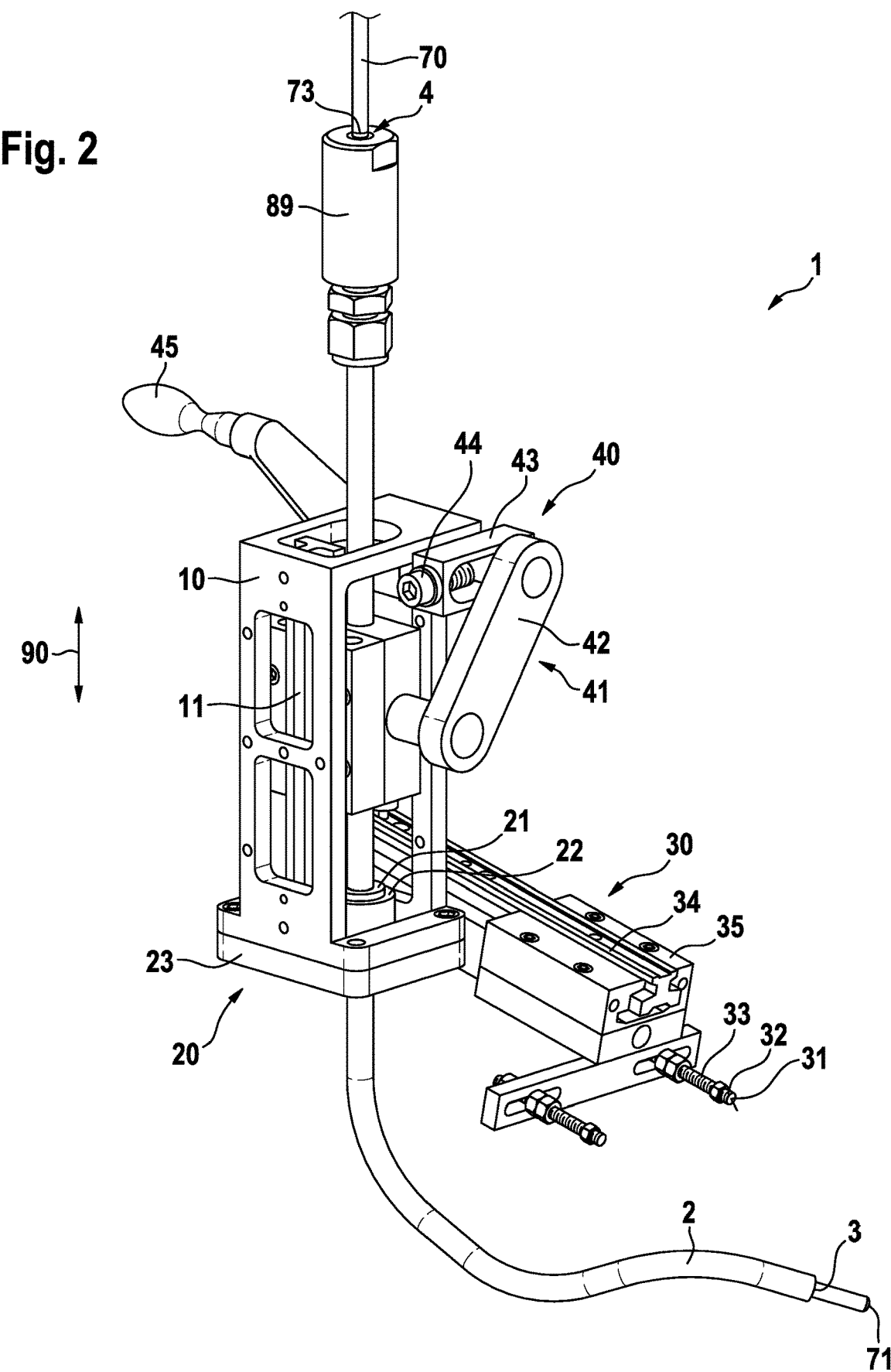
FIG. 2 is a detailed illustration of an embodiment of a device according to the invention.

In FIG. 2, a first embodiment of a device 1 according to the invention for borescope inspection of turbine blades 82 of the first high-pressure turbine stage 81 of a jet engine 80 is illustrated. The device 1 comprises a guide pipe 2, which can be introduced through a lateral opening 85 in a jet engine 80 (cf. FIG. 1). One end 3 of the guide pipe 2 is provided for introduction into the jet engine 80. At the other end 4, a flexible borescope 70 can be introduced until the borescope objective 71 protrudes slightly from the other end 3 of the guide pipe 2 in such a manner that the image range of the borescope 70 is not disrupted by the guide pipe 2. In order to ensure that the borescope 70 protrudes only by a predetermined length from the guide pipe 2, the borescope 70 has a marking 73 which is calibrated to the other end 4 of the guide pipe 2. If the marking 73 of the borescope 70 is at the other end 4 of the guide pipe 2, the borescope 70 protrudes with the objective 71 thereof at one end 3 by the predetermined length from the guide pipe 2. The borescope 2 may be secured in this position by the fixing element 89.

The guide pipe 2 is guided in a linear manner in a guide 10. To this end, the guide pipe 2 is securely connected to a carrier 5 which is guided in a play-free manner on a linear guide 11 so that the guide pipe 2 can be moved exclusively in the direction indicated by the arrow 90. Therefore, the guide pipe 2 has—if it is guided in the guide 10—only a purely translational degree of freedom, whereby the guide pipe 2 can be positioned in a clear and reproducible manner with respect to the guide 10—that is to say, by means of a corresponding displacement along the guide 10.

The device 1 further comprises a hollow screw 21 with a conical head 22 which together with a counter-piece 23 forms a securing device 20, via which the device 1 can be secured to the outer side of a jet engine 80. As further explained below with reference to the FIGS. 3a-c, the conically formed head 22 of the hollow screw 21 allows securing of the device 1 in the desired orientation of the guide 10 since a movable portion is provided between the hollow screw 21 as a component of the securing device 20 and the counter-piece 23, as an additional component of the securing device 20.

Furthermore, with the device 1, another orientation unit 30 is provided as a portion of the securing device 20. The orientation unit 30 is securely connected to the counter-piece 23 of the securing device 20 and has a plurality of stop faces 31 in the form of the free ends 32 of adjusting screws 33. Furthermore, the adjusting screws 33 are further arranged on a carriage 35 which can be displaced along a linear guide 34, wherein the carriage 35 can be secured in any position along the linear guide 34.

The device 1 also comprises a guide mechanism 40 by means of which the guide pipe 2 can be moved along the guide 10, whereby ultimately one end 3 of the guide pipe 2 and consequently the objective 71 of a borescope 70 which is introduced into the guide pipe 2 can also be moved in a linear manner parallel with the direction 90.

The guide mechanism 40 comprises a crank drive 41, the connection rod 42 of which is pivotably secured at one end thereof to the carrier 5. At the other end thereof, the connection rod 42 is rotatably connected with a crankpin which is arranged remote from the crank axis to a crank 43, wherein the crank 43 is in turn rotatably supported about the crank axis. Via the adjusting screw 44, the spacing between the crank pin and crank axis can be changed, whereby the travel carried out by the carrier 5 can be adjusted in terms of the length thereof. In order to activate the crank drive 41, a hand crank 45 is provided. However, it is also possible to provide a controllable drive in place of the hand crank 45.

Alternatively, it is also possible to configure the guide mechanism 40 as a spindle drive for the carrier 5.

As can be seen below from the explanation of FIGS. 3a-c, the device 1 according to FIG. 1 can be disassembled into individual sub-assemblies, whereby the use of the device 1 is facilitated. A first sub-assembly comprises the securing device 20 with the orientation unit 30, a second sub-assembly comprises the guide pipe 2 including the carrier 5. The third sub-assembly comprises the guide 10, whilst the guide mechanism 40 forms the fourth sub-assembly.

Figure 3A:
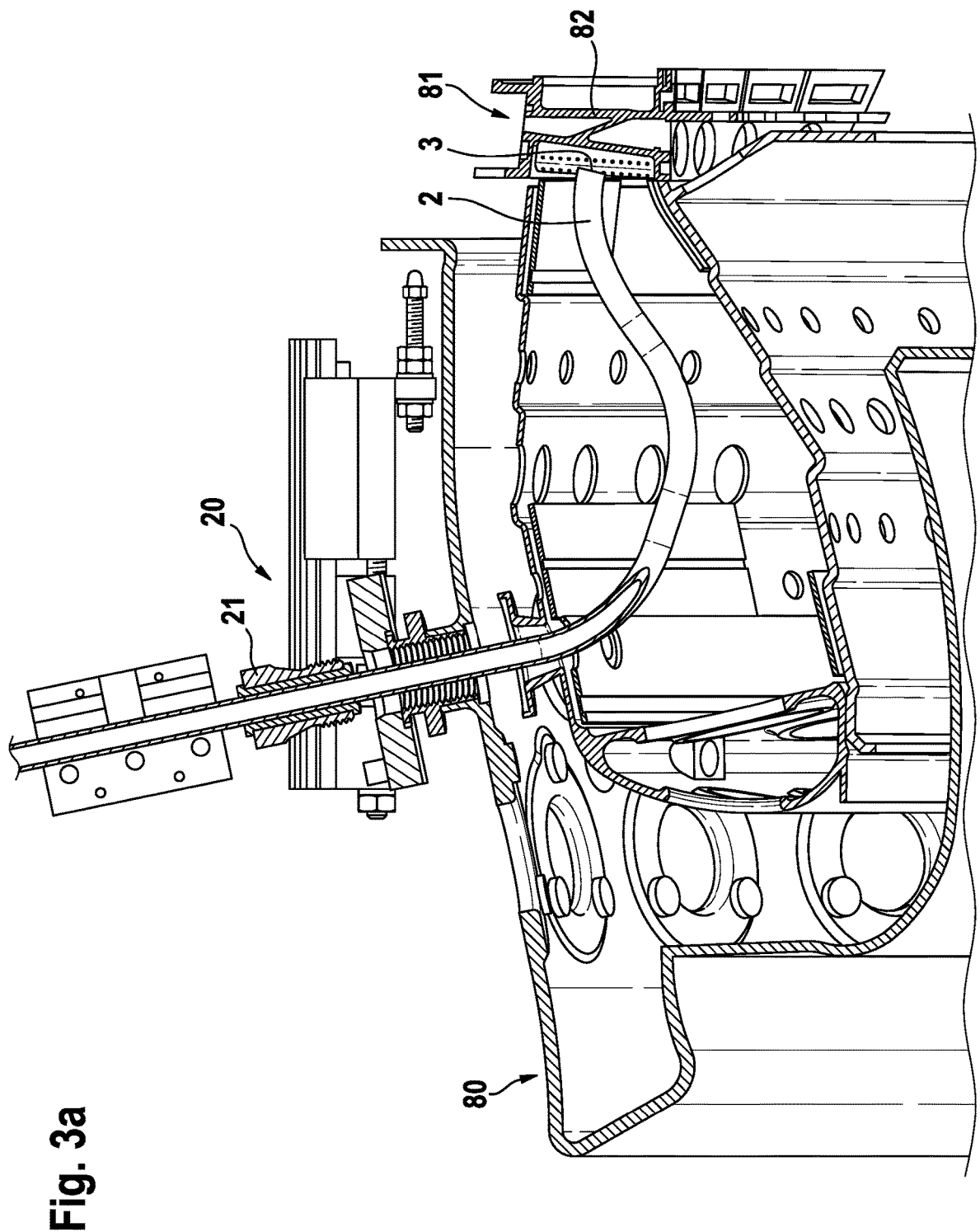
FIGS. 3a-c are schematic illustrations of a use of the device from FIG. 2.
Figure 3B:
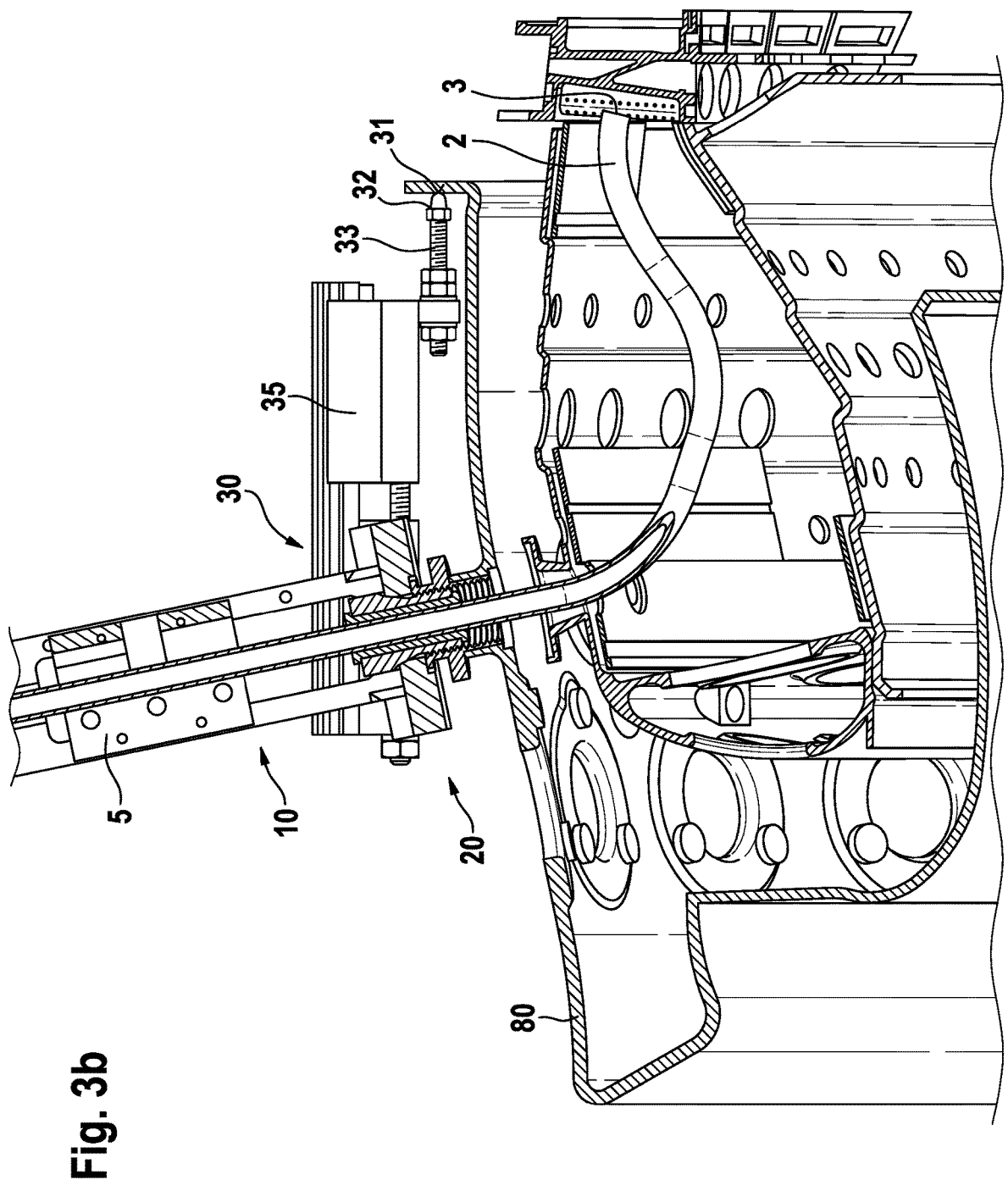
Figure 3C:
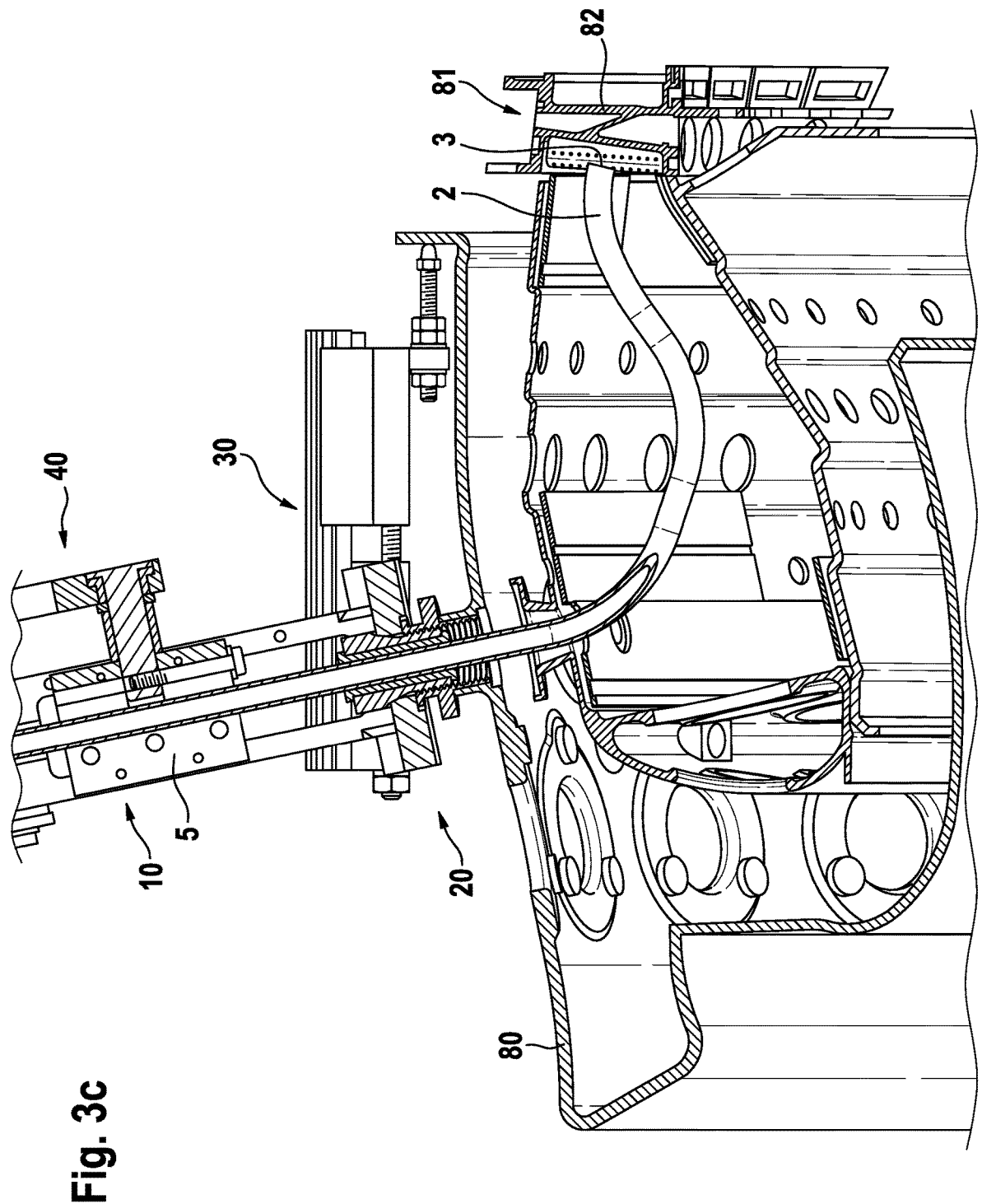

FIGS. 3a-c schematically illustrate a typical assembly of the device 1 from FIG. 2 in a jet engine 80 so that the method according to the invention can be carried out as in FIG. 1.

Beginning with FIG. 3a, in a first step the first sub-assembly comprising the securing device 20 was initially placed on a lateral opening 85 of the jet engine 80 provided for introducing the guide pipe 2—in this embodiment, a spark plug retention member, but not yet securely connected thereto. Subsequently, the guide pipe 2 was guided as a second sub-assembly through the hollow screw 21 of the securing device 20 and subsequently through the opening 85 in the jet engine 80 so that one end 3 of the guide pipe 2 is already in principle arranged in front of the turbine blades 82 of the first high-pressure turbine stage 71, which blades are intended to be inspected.

Afterwards, the securing device 20 is orientated and the guide 10 is securely connected to the securing device 20 so that the orientation of the guide 10 is clearly defined by the orientation of the securing device 20. In FIG. 3b, the result of the steps which are described in greater detail below is illustrated.

Initially, the hollow screw 21 is screwed into the thread of the opening 85 in the jet engine 80, but not tightened so that, although the position of the securing device 20 with respect to the jet engine 80 and in particular the opening 85 is substantially fixed, the position of the securing device 20 can certainly still be changed.

Subsequently, the carriage 35 of the orientation unit 30 is displaced into a predetermined position and fixed at that location. In this position of the carriage 35, the stop faces 31 adjoin the free ends 32 of the screws 33 on a component of the jet engine 80—in this instance, a flange of the housing. This abutment ensures the correct orientation of the securing device 20, in which the securing device 20 is subsequently ultimately secured by tightening the hollow screw 21 on the jet engine 80.

Afterwards, the guide 10 is secured to the securing device 20, wherein the carrier 5 of the cleaning lance 2 is introduced into the linear guide 11. Since the securing device 20 is orientated via the orientation unit 30, the guide unit 10 which is securely connected thereto is also considered to be orientated since the guide unit 10 can be secured only in one predetermined position to the securing device 20.

Finally, the device 1 is further completed as shown in FIG. 3c by the guide mechanism 40 (only partially illustrated) being mounted on the guide 10. As a result of the guide mechanism 40, the carrier 5 can be moved in a linear manner along the guide rail 11, whereby the end 3 of the guide pipe 2 also makes a corresponding movement. As a result of suitable orientation of the guide pipe 2 by means of corresponding orientation of the guide 10 or the securing device 20 and suitable adjustment of the travel length via the adjustment screw 44 of the crank drive 41, a turbine blade 82 can be travelled and inspected over the entire length thereof by guiding a borescope 70 through the guide pipe 2.

Figure 4A:
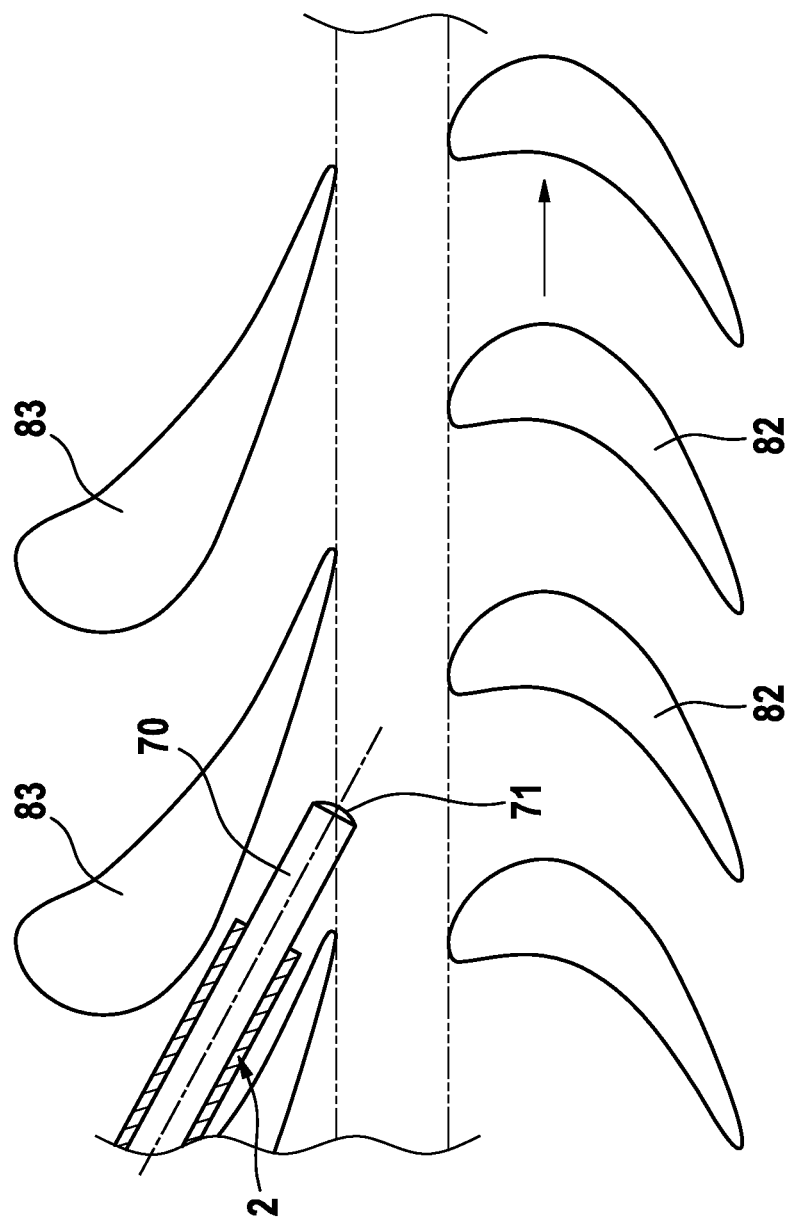
FIG. 4a, b are schematic illustrations of the free end of borescopes guided through the device according to FIGS. 2 and 3.

The borescope 70 which is intended to be guided through the guide pipe 2 is not a direct component of the device shown in FIGS. 2 and 3. Instead, the device 1 can be freely used with different borescopes 70. As shown in FIG. 4a, b, the device can even be used with different construction types of flexible borescopes 70.

As illustrated in FIG. 4a, the borescope 70 may have a coaxially arranged borescope objective 71. The borescope 70 which is flexible per se protrudes only so far out of the guide pipe 2 that the protruding portion of the borescope 70 also does not deviate from the orientation predetermined by the guide pipe 2 as a result of gravitational force.

In FIG. 4b, an alternative embodiment of a borescope 70 is shown. In this borescope 70, a CCD chip or CMOS chip with an adhesively bonded lens is provided as a borescope objective 71. Furthermore, another LED 72 for illuminating the image range of the borescope objective 71 is provided. Since both the borescope objective 71 and the LED 72 are arranged laterally on the borescope 70, its tip can be angled in order to thus be able to orientate the borescope objective 71 toward the turbine blades 82 of the first high-pressure turbine stage 82.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for borescope inspection of turbine blades of a high-pressure turbine stage of a jet engine, the device comprising:
    a bend-free guide pipe for introducing a flexible borescope;
    a guide for the guide pipe, the guide being configured to provide unambiguous and reproducible positioning and orientation of the guide pipe;
    a securing device configured to releasably secure the guide to an outer side of the jet engine; and
    an orientation device coupled to the securing device configured to adjust the guide to a predetermined orientation with respect to the outer side of the jet engine, the orientation device comprising an adjustable stop face in contact with the jet engine configured to position the securing device at each discrete adjustment of the adjustable stop face relative to the jet engine, and
    wherein the guide pipe is rigid and shaped in such a manner that an end of the guide pipe that is introduced into the jet engine when the guide is orientated correctly is orientable so as to be directed between two predetermined guide blades.

2. The device as claimed in claim 1, wherein the guide is constructed to limit movability of the guide pipe to one degree of freedom.

3. The device as claimed in claim 1, wherein the securing device comprises a threaded portion that is configured to engage in a thread of a through-opening of the guide pipe.

4. The device as claimed in claim 1, wherein the orientation device is configured to adjust the guide to the predetermined orientation with respect to the outer side of the jet engine using one or more adjustable stop faces that are configured to abut the jet engine.

5. The device as claimed in claim 1, wherein the device comprises a crank configured to move the guide pipe along the guide.

6. The device as claimed in claim 1, wherein the device comprises a helical gear for moving the guide pipe along the guide by rotating a threaded spindle of the helical gear.

7. The device as claimed in claim 5, wherein the guide mechanism comprises a controllable drive that is configured to move the guide pipe along the guide.

8. The device as claimed in claim 1, wherein the guide pipe and the end thereof which is configured to be introduced into the jet engine are spaced apart in a condition where the front edges of the guide blades are secured.

9. The device as claimed in claim 1, wherein the guide pipe has a stop configured such that, upon the flexible borescope being fully inserted into the guide pipe for detecting the turbine blades, the stop interacts with the flexible borescope such that the flexible borescope is positionable to protrude up to a maximum of 150 mm from an objective end of the guide pipe.

10. A method for inspecting turbine blades of a high-pressure turbine stage of a jet engine using a device comprising a guide for a guide pipe, the guide being configured to provide clear and reproducible positioning and orientation of the guide pipe; and a securing device configured to releasably secure the guide to an outer side of the jet engine, wherein the securing device is configured to adjust the guide to a predetermined orientation with respect to the outer side of the jet engine, and wherein the guide pipe is rigid and shaped in such a manner that an end of the guide pipe that is introduced into the jet engine is orientable so as to be directed between two predetermined guide blades, the method comprising:
    a) introducing the guide for the guide pipe of the device into a predetermined lateral borescope opening;
    b) securing the device to the predetermined lateral borescope opening of the jet engine in a predetermined orientation;
    c) introducing a flexible borescope into the predetermined lateral borescope opening through the guide pipe of the device;
    d) rotating the high-pressure turbine stage and an additional component of the jet engine, the additional component being connected to the high-pressure turbine stage, in a rotationally secure manner under observation while the flexible borescope remains stationary until an identification feature of the additional component is in a predetermined position; and
    e) identifying the turbine blades which can be seen through the first borescope as first turbine blades.

11. The method as claimed in claim 10, the method further comprising:
    introducing a second rigid borescope into an additional borescope opening of the jet engine; and
    detecting the blades of a compressor stage, which is arranged on a shaft of the turbine blades of the first high-pressure turbine stage, using the second rigid borescope.

12. The method as claimed in claim 11, wherein the second borescope is rigid and/or can be connected to the jet engine.

13. The method as claimed in claim 11, wherein the identification feature of the compressor stage is a blade lock.

14. The method as claimed in claim 11, wherein the identification feature of the compressor stage is that of a plurality of blade locks, the spacing of which in a peripheral direction counter to a predetermined rotation direction between the blade lock and the adjacent blade lock is minimal.

15. The device of claim 2, wherein the degree of freedom is configured such that linear movement along the degree of freedom of the end of the guide pipe, in a condition where the guide pipe is introduced into the jet engine, corresponds to radial movement along a radius of an axis of the jet engine.

16. The device of claim 3, wherein the threaded portion is part of a hollow screw having a conical head.

17. The device of claim 4, wherein at least a portion of the stop faces are adjustable.

18. The device of claim 6, wherein the crank of the crank drive is longitudinally adjustable.

19. A device for borescope inspection of turbine blades of a high-pressure turbine stage of a jet engine, the device comprising:
a bend-free guide pipe;
a guide for the bend free guide pipe configured to introduce a flexible borescope;
a connection rod coupled via a crank to the guide and a rotational input such that the rotational input is translated into linear displacement of the guide;
a securing device comprising a hollow structure through which the guide enters a predetermined lateral borescope opening of the jet engine, the hollow structure coupled to a counter-piece; and
an orientation device comprising an adjustable stop face connected to the counter-piece configured to position the counter-piece at each discrete adjustment of the adjustable stop face relative to the jet engine.

20. The device of claim 19, wherein the hollow structure through which the guide enters the predetermined lateral borescope opening of the jet engine further comprises a hollow screw with a conical head configured to move along the guide.

* * * * *